United States Patent [19]

Georgiou

[11] Patent Number: 5,039,986

[45] Date of Patent: Aug. 13, 1991

[54] HIGH SPEED DYNAMIC ALLOCATOR FOR VARIOUS LENGTH TIME SLOTS

[75] Inventor: Christos J. Georgiou, White Plains, N.Y.

[73] Assignee: International Business Machines Corporation, Armonk, N.Y.

[21] Appl. No.: 629,007

[22] Filed: Dec. 18, 1990

Related U.S. Application Data

[63] Continuation of Ser. No. 271,478, Nov. 15, 1988, abandoned.

[51] Int. Cl.[5] ............................................. H04Q 11/00
[52] U.S. Cl. ................................. 340/825.79; 370/58.1; 370/84.1
[58] Field of Search ..................... 370/58.1, 94.1, 64; 364/200, 900; 379/280, 285, 284; 340/825.79, 825.83, 825.8

[56] References Cited

U.S. PATENT DOCUMENTS

| | | | |
|---|---|---|---|
| 4,331,956 | 5/1982 | Anderson | 340/825.89 |
| 4,630,045 | 12/1986 | Georgion | 340/825.79 |
| 4,639,910 | 1/1987 | Toegel et al. | 370/58 |
| 4,698,801 | 10/1987 | Hatano et al. | 370/58 |
| 4,814,762 | 3/1989 | Franaszek | 340/825.83 X |
| 4,845,704 | 7/1989 | Georgiou et al. | 370/58 |

*Primary Examiner*—Ulysses Weldon
*Attorney, Agent, or Firm*—Whitham & Marhoefer

[57] ABSTRACT

An improved multiplex controller circuit allows fast, on demand allocation of variable length time slots in a voice/data communications system. The controller circuit directly maps a triangular connection matrix into hardware, thereby providing hardware parallelism Each one of the coordinate points of the matrix is implemented with a flip-flop ($L_{ij}$). The inputs of the flip-flops are provided by a Port Activity Register (PAR), and the outputs of the flip-flops are fed into a Priority Encoder circuit (PE) which generates the address of a switch adapter with which a connection can be established. In this manner, a high speed dynamic allocator of variable length time slots which solves controller bottleneck problems in time critical systems is realized.

5 Claims, 4 Drawing Sheets

HIGH SPEED DYNAMIC ALLOCATOR FOR VARIOUS LENGTH TIME SLOTS

CROSS-REFERENCE TO RELATED APPLICATION

This application is a continuation of application Ser. No. 07/271,478 filed Nov. 15, 1988. This application is also related in subject matter to copending application Ser. No 07/033,437, filed Apr. 1, 1987, now U.S. Pat. No. 4,845,704, by Georgiou et al. for "Switching System for Integrated Voice/Data Communications", and assigned to the assignee of this application. The disclosure of application Ser. No. 07/033,437 is incorporated herein by reference.

BACKGROUND OF THE INVENTION

1. Field of the Invention

The present invention generally relates to multiplex communications systems and, more particularly, to a controller circuit for the fast allocation of variable length time-slots in voice/data switching systems.

2. Description of the Prior Art

With the recent growth in the use of computers, there has been an increase in demand for data. Much of this demand also comes from terminal locations which also have a need for the transmission of voice or, more broadly, for synchronous transmission. Thus, there is a demand for integrated switching of voice and data. Various schemes for the switching of voice and data have been developed. The most recent of which are time division switching schemes or a combination of time and space switching schemes. However, as will be described below, these methods provide low capacity integrated voice and data switching with high costs and poor growth potential.

One system for integrating the switching of circuit and packet data using both time and space switching is described in U.S. Pat. No. 3,766,322 to Moffet et al. The system described therein uses a number of cross-point switching matrices for the space switching, with one dedicated matrix to each data-rate category being switched. Both circuit and packet data can be transmitted through the same matrix if they are of the same data rate. Also, individual time division switches, dedicated to each data rate being switched, are used to perform the time switching. The system described in Moffet et al. is a relatively low speed and hence low capacity system. It can also be seen that any attempt to increase the number of switched data rate categories using an apparatus of the type described by Moffet et al. would result in a complex apparatus involving a large number of individual time and space switches. This complexity is a result of the need to dedicate a time and a space switch to each data rate category. To grow with increased demand, even without increasing the number of data rate categories, could also require a number of space and time switches because of the need to dedicate individual facilities for each data rate category. Thus, the Moffet et al. switching system, by requiring a number of dedicated matrices and time switches, makes system growth relatively difficult and facility costs high.

Another switching mechanism for both circuit and packet switching is disclosed in U.S. Pat. No. 4,413,337 to Dauphin et al. This mechanism uses only time division switching and not space division switching. Thus, the system disclosed therein offers a relatively low capacity system servicing in the vicinity of up to 256 64-kbit/sec circuit channels.

In switching systems for integrated voice/data communications, there is a need to establish the same connections over a number of consecutive time intervals. If the time slots are of fixed size, as is common in prior art switching systems, an allocation mechanism consisting of memory and counter with associated control logic usually suffices. However, modern switching system applications require fast, on demand allocation of variable length time slots in a communications system.

SUMMARY OF THE INVENTION

It is therefore an object of the present invention to provide a high speed dynamic allocator of variable length time slots which solves controller bottleneck problems in time critical systems.

It is another object of the invention to provide a multiplex controller which allows the fast, on demand allocation of variable length time slots in a communications system.

According to the invention, there is provided a controller circuit for the fast allocation of variable length time slots in voice/data switching systems in which a triangular connection matrix is directly mapped into hardware. Each one of the coordinate points of the matrix is implemented with a flip-flop. The inputs to the flip-flops are provided by a "Port Activity" register, and the outputs of the flip-flops are fed into an encoder circuit which generates the address of a switch adapter with which a connection can be established.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF A PREFERRED EMBODIMENT OF THE INVENTION

Figure 1:
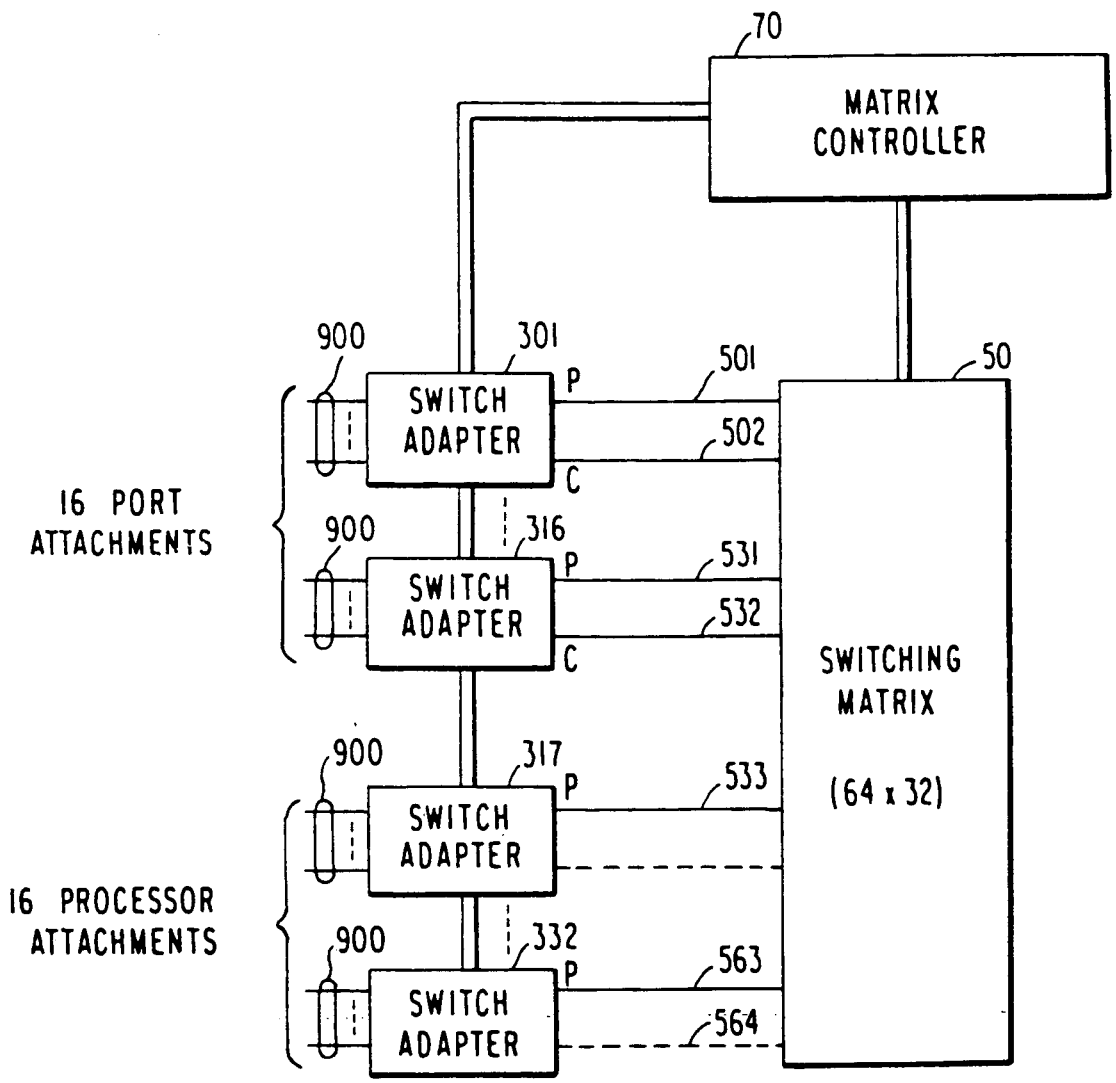
FIG. 1 is a block diagram of the overall apparatus used in the preferred embodiment of the invention.

Referring now to the drawings, and more particularly to FIG. 1, there is shown the overall block diagram of the apparatus used in the preferred embodiment of this invention. A plurality of port attachments (not shown) are coupled to the input-output lines 501–532 of the switching matrix 50 through the port switch adapters 301–316, and processor attachments (also not shown) are coupled to the input-output lines 533–564 of the switching matrix 50 through the processor switch adapters 317–332. The port switch adapters 301–316 are used to handle both voice and data. The processor switch adapters 317-332 are used to handle data only. A port/processor attachment is also referred to as a node. The port/processor attachments are coupled to the switch adapters by buses 900. Each port/processor switch adapter can accommodate nodes of up to approximately 1,000 terminals. Each terminal could be connected to a data set or a telephone set. This embodiment uses 1024 terminals. The port switch adapters 301-316 are connected to the switching matrix 50 via input-output lines 501-532 which are dual lines for full duplex operation. The processor switch adapters 317-332 are connected to switching matrix 50 via input-output lines 533-564 of the matrix, which lines are also dual lines for full duplex operation. The input-output lines for transmitting synchronous signals are referred to as circuit input-output lines, while input-output lines for the transmission of asynchronous signals are referred to as data input-output lines. Connections in switching matrix 50 are established by matrix controller 70. For maximum switching speed, a microprogrammed controller is preferred. The request for various connections in the switching matrix 50 are sent from the switch adapters 301-332 to the matrix controller 70 in the form of a data request mask or circuit request mask.

The system shown in FIG. 1 provides a high-capacity integrated voice and data switching system which groups voice and data bound for the same destination into a frame and stores packets bound for the same destination into a packet memory. This system is disclosed in more detail in U.S. Pat. No. 4,845,704 to Georgiou et al. In that system, the framed and stored data are transmitted through the switching matrix 50. Thus, the frame length varies as circuit connections (i.e., telephone calls) are added or removed from the system. This mechanism has the advantage of requiring a single controller 70 only, which is also used to route regular packet (i.e., data) traffic. The routing of the frames, which is equivalent to allocating time-slots of variable length, must be handled within the time interval dictated by the voice sampling frequency, which is typically 125 microseconds.

Figure 2:
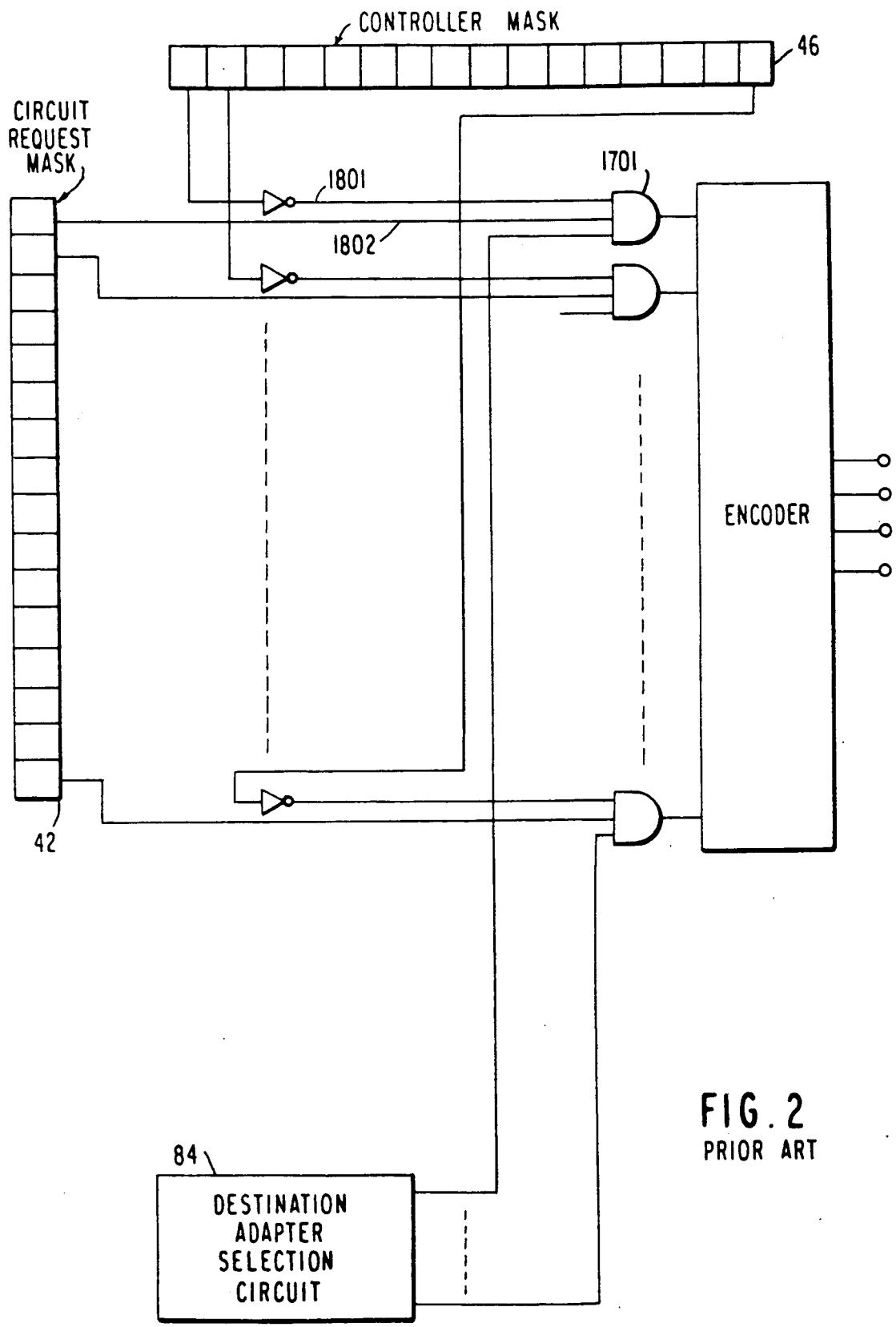
FIG. 2 is a block diagram of a circuit used to select an available adapter as used in a prior system.

The present invention improves upon the circuit shown in FIG. 8 of U.S. Pat. No. 4,845,704 to Georgiou et al. That circuit, reproduced in FIG. 2, is part of the controller 70 and is used to generate the address of a requested available adapter. The connection information is passed to the controller from each port by means of a request mask. The controller reads this information into request mask register 42, updates controller mask 46, and extracts the address of the destination port to be selected from the encoder circuit. If no connection is possible to any destination from the requesting port, the output of the encoder will be invalid (i.e., no address) and a controller cycle will be lost. Then the controller may attempt to service the next port in sequence. However, that port may also not have a corresponding free destination port and, thus, another controller cycle will be lost. Losing controller cycles, coupled with the transmission time of the request mask, may have serious implications on the overall performance of the controller.

Figure 3:
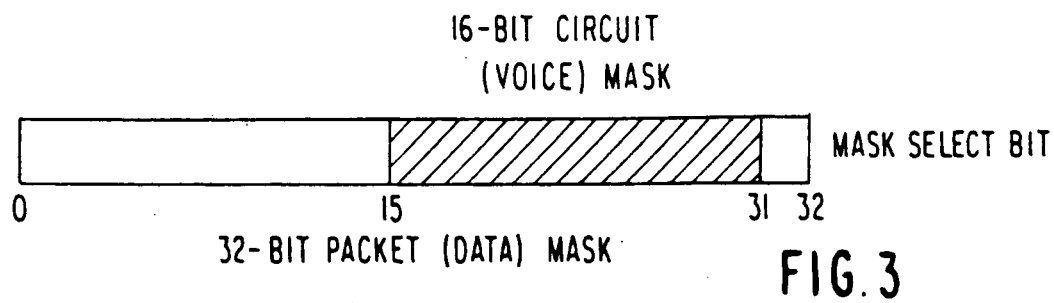
FIG. 3 is an illustration of a request mask of N bits as used in a prior system.

According to the invention disclosed in U.S. Pat. No. 4,845,704 to Georgiou et al., the time slot allocation is handled as follows. Each one of the N switch adapters 301-316 and 317-332 in FIG. 1 passes to the controller 70 a mask of N bits, as shown in FIG. 3, each bit indicating whether a connection is required with the corresponding adapter. This mask is compared against a register 46 shown in FIG. 2 in the controller 70 containing the current status the switch adapters, i.e., busy or not busy, and selects one of the not busy adapters for which a connection is requested. This method requires the expense of an N-bit wide bus between the controller 70 and switch adapters for transferring the mask and may result in time delays associated with the mask transfer.

Figure 4:
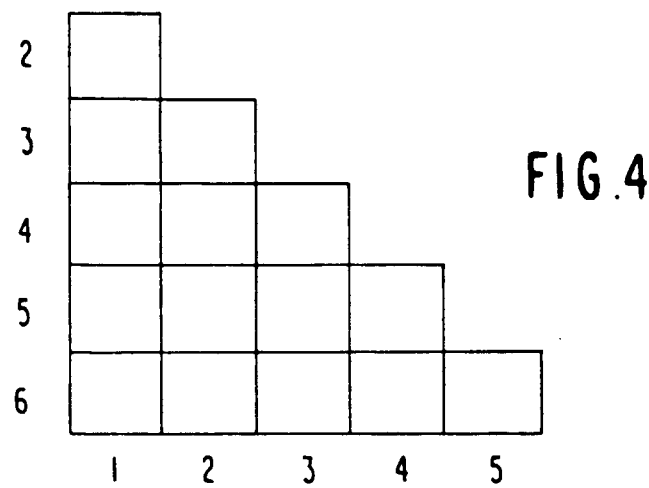
FIG. 4 is an illustration of a triangular connection matrix illustrating the principles of the present invention.
Figure 5:
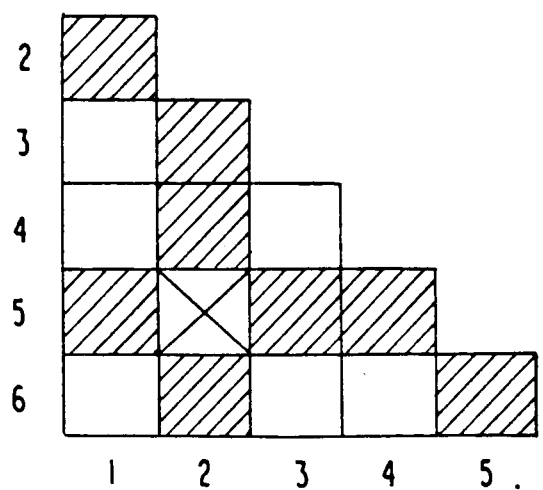
FIG. 5 is an illustration of the triangular connection matrix shown in FIG. 4 shaded to show the unavailability of certain connections due to the establishment of a connection.

The circuit according to the present invention is described as follows. In a system with N switch adapters, there are $N(N-1)$ possible connection combinations. If we assume that the transfers A to B and B to A between two ports A,B can be done in one operation (full duplex mode), there are only $N(N-1)/2$ possible connections. FIG. 4 shows a triangular matrix of all connections for six ports; e.g., 6-1, 6-2, 6-3, etc. Once a connection between two ports has been established, a number of other possible connections are eliminated. In a triangular matrix representation of the possible connections, all matrix entries that lie on the row and column that contain the entry for the established connection are eliminated. FIG. 5, for example, shows the connection ports 5,2 and the resulting elimination of the other connections.

Figure 6:
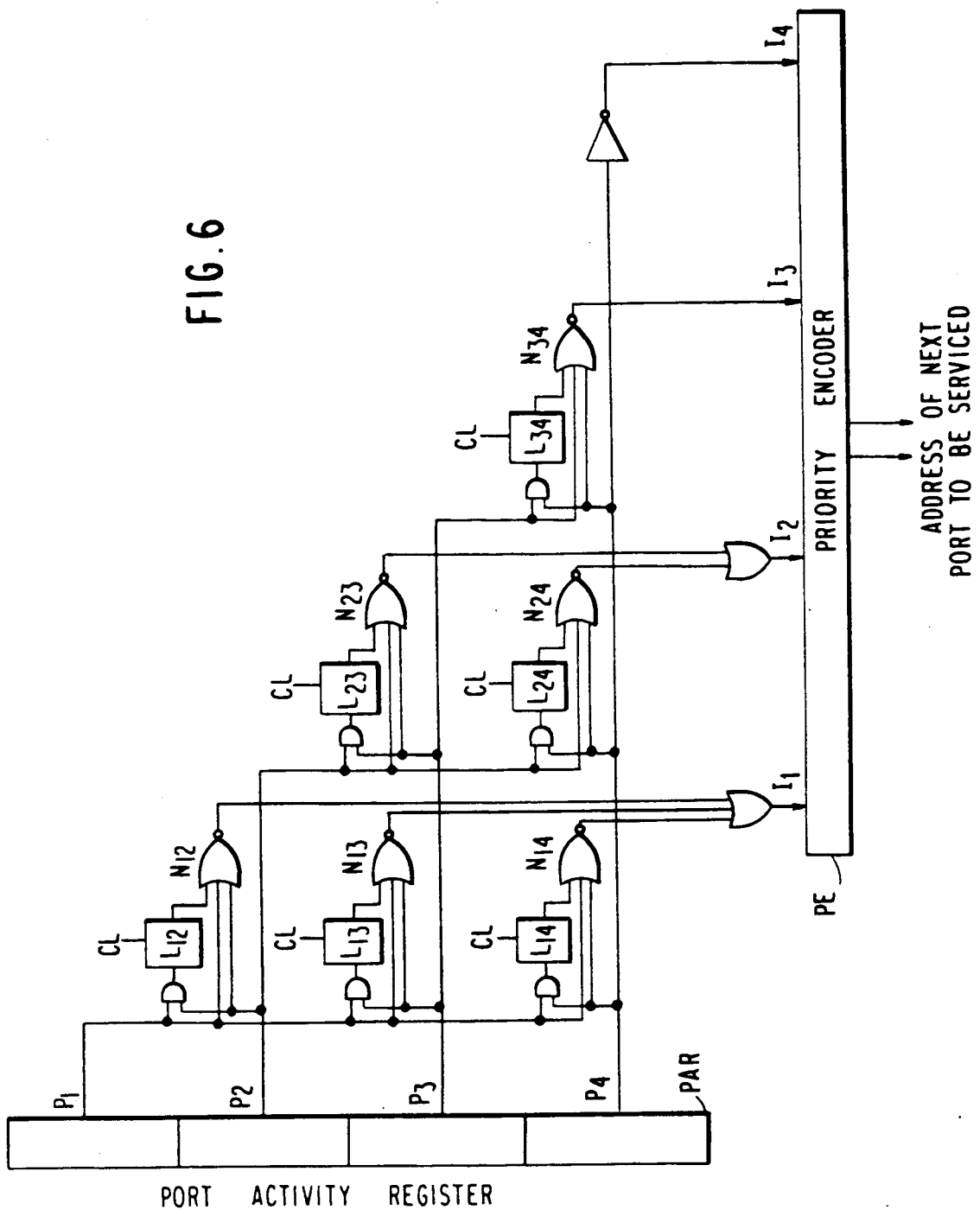
FIG. 6 is a block and logic diagram showing the circuit according to the present invention used to select an available adapter.

Referring now to FIG. 6, there is illustrated an example of a four port switch. Each one of the coordinate points of the matrix, except the last one, is implemented with a flip-flop $L_{ij}$. The last point does not require a flip-flop and is implemented by a single invertor. Inputs to the flip-flops are provided by bits $P_k$ of the Port Activity Register (PAR) which contains the same information as controller mask 46 in FIG. 2. The output of each flip-flop $L_{ij}$ is fed into a Priority Encoder (PE) circuit which generates the address of a switch adapter with which a connection can be established.

In the serial circuit of FIG. 2, the circuit request mask is sent to the controller 70 from each port that requests a connection. If there is no match of available ports (to be found through the comparison of the controller mask 46 with the request mask 42), a controller cycle will be lost. Then, in the next controller cycle, another port sends in its request mask, and so on until a match is found.

By contrast, the parallel circuit of FIG. 6 finds, within a single cycle, any available connections and presents that information to the controller 70. This is done by means of the triangular matrix of FIG. 6, which represents all possible connections among ports $P_1 \ldots P_n$. Each flip-flop $L_{ij}$ represents whether a particular connection has been made or not.

The circuit of FIG. 6 works as follows. At the beginning of a port service cycle (which we can define as the period during which all ports are serviced once), all flip-flops are cleared; i.e., all bits $P_k$ of the Port Activity Register PAR are 0 and the states of the flip-flops $L_{ij}$ are also at 0. Thus, the outputs of the NOR gates $N_{ij}$ are high and the Priority Encoder circuit PE selects port $P_1$ as the address of the next port to be serviced. The controller 70, then, uses address P1 to set the corresponding entry in the Port Activity Register PAR; i.e., a single bit. This disables input $I_1$ to the Printing Encoder PE. Then, the Printing Encoder PE selects a port from the remaining ports, e.g., $P_2$, and sets its corresponding entry in Port Activity Register PAR. This sets flip-flop $L_{12}$ to 1 because the AND gate at its input is enabled. The outputs of the NOR gates $N_{1j}$ and $N_{34}$ are low. Thus, $I_1$ and $I_2$ are 0 and Priority Encoder circuit PE selects port $P_2$.

The next step is for the controller 70 to make the connection between $P_1$ and $P_2$ in the switching matrix and send a signal to $P_1$, saying that it has been connected to $P_2$ (along with the address of $P_2$), and vice versa. Of course these operations could take place in parallel.

When the connection between $P_1$ and $P_2$ is no longer needed, $P_1$ and $P_2$ send a disconnect signal to the controller 70, which in turn clears their corresponding entries in PAR. This clears entries $I_1$ and $I_2$ to the PE but does not clear flip-flop $L_{ij}$ (thus indicating that connection $P_1$-$P_2$ has been serviced). PE, then, selects another pair of available ports without losing any cycles. In FIG. 5, resetting the Port Activity Register PAR entries will result in the shaded areas being cleared up.

When all the connections have been serviced, i.e., all flip-flops $L_{ij}$ are set, a service cycle has been completed. A new service cycle can then begin by clearing all flip-flops $L_{ij}$.

As will be appreciated from the foregoing description, no circuit request mask is passed to the controller 70 from a port. Both request mask 42 and controller mask 46 in FIG. 2 are replaced by Port Activity Register PAR, which is internally set. If some connections $L_{ij}$ need not be established, the corresponding flip-flops can be set at system initialization and be prevented from being reset by means of an additional control line, which would gate out their CL inputs.

The delay of this circuit is extremely small as it involves only the signal propagation through a NOR gate, an OR gate and the Priority Encoder. This circuit can be easily implemented on a single chip, even for relatively large size systems. For example, a 64 port switch would require $64 \times 63/2$ or a 2016 matrix, which is well within the capabilities of the current VLSI technology.

In contrast to the circuit shown in FIG. 2, the circuit of FIG. 6 contains the information of both the request and controller masks and, as a result, there is no need for passing that information between the switch ports and the controller. The circuit examines in parallel any potential connection combination and will find if a connection is possible from any port to any other port. Thus, at the beginning of a port service cycle, the output of the Priority Encoder PE will give the address of a free port, for example, port $P_1$. The controller 70 will read the address $P_1$ and will set the corresponding bit in the Port Activity Register (PAR). Then, the Priority Encoder PE will generate the address of another free port, for example, port $P_2$. The controller will connect these two ports in the switching matrix 50 and will send the address $P_1$ to port $P_2$ and the address $P_2$ to port $P_1$, along with a signal indicating that they are connected. $P_1$ and $P_2$ will transmit a frame to each other. Upon completion of transmission, they will indicate to the controller 70 via a single line per port (or a time-multiplexed line) that the transmission has ended. The controller 70 will then clear bits $P_1$ and $P_2$ in the Port Activity Register PAR.

Going back to the port selection operation, after the controller has selected ports $P_1$ and $P_2$ as described above, it will select another pair of ports as indicated by the output of the priority encoder. A service cycle will end when all potential port connections have been made. This would be indicated by all flip-flops $L_{ij}$ being set. The detection of this condition could be made by feeding all outputs of the flip-flops $L_{ij}$ in FIG. 6 into a big NAND gate. A zero output of the NAND gate will indicate an end of a service cycle.

The essence of this invention is that with variable length packets, the end of a packet transmission may occur asynchronously to the end of any other ongoing transmission. This means that the connected ports will be freed in a skewed manner, thus allowing only a subset of future connections to be made. The controller 70 can only make a fast determination on which port can be connected to another port if it has access to all connection information. This is provided by the triangular array of flip-flops and associated circuitry in FIG. 6.

While the invention has been described in terms of a preferred embodiment in the environment of voice/data communications systems, those skilled in the art will recognize that the invention could be used in other fast packet switching systems and, moreover, can be practiced with modification within the spirit and scope of the appended claims.

Having thus described my invention, what I claim as new and desire to secure by Letters Patent is as follows:

1. In a communications switching system including a switching matrix having an array of cross-points to interconnect a plurality of N input-output lines of the matrix, said N input-output lines of the matrix being connected to N input-output ports of said switching system, said switching system further including a controller connected to said switching matrix and responsive to said N input-output ports for controlling said cross-points to make requested interconnections between said plurality of N input-output lines, the improvement in said controller comprising:

port activity register means containing N stages for storing an indication of an active or inactive status of each of said N input-output ports, said N stages defining both row and column outputs;

triangular selection matrix means containing $N(N-1)/2$ cells corresponding to all possible combinations of connections between said input-output ports and arranged in rows and columns, said rows and columns being connected to said row and column outputs of said port activity register means, said triangular selection matrix means examining in parallel any potential connection combination to determine if a requested connection is possible between any port and any other port; and encoder means for receiving an output from said selection matrix means and generating an address of a free port to be used in setting up a connection between a pair of said input-output ports.

2. The improved controller as recited in claim 1 wherein each of said cells, except one, comprise a flip-flop, an AND gate and a NOR gate, said AND gate being connected to set said flip-flop in response to a selected pair of stages of said port activity register being set to a logic 1 level indicating that ports corresponding to those stages are active, said NOR gate receiving as inputs an output from said flip-flop and one of said row outputs and one of said column outputs from said port activity register means, an output from said NOR gate being supplied to said encoder means.

3. In a communications switching system including a switching matrix having an array of cross-points to interconnect a plurality of N input-output lines of the matrix, said N input-output lines of the matrix being connected to N input-output ports of said switching system, said switching system further including a controller connected to said switching matrix and responsive to said N input-output ports for controlling said cross-points to make requested interconnections between said plurality of N input-output lines, the improvement in a method of switching signals through said switching matrix between said N input-output lines comprising the steps of:

storing an indication of an active or inactive status of each of said N input-output ports in a port activity register having N stages corresponding to said N input-output ports;

examining each stage of said port activity register in parallel in a triangular matrix of N(N−1)/2 cells corresponding to all possible connections between said N input-output ports any potential connection combination to determine if a requested connection is possible between any port and any other port; and generating an address of a free port corresponding to a possible connection between any port and any other port to be used in setting up a connection between a pair of said input-output ports.

4. In a communications switching system including a switching matrix having an array of cross-points to interconnect a plurality of N input-output lines or the matrix, said N input-output lines of the matrix being connected to N input-output ports of said switching system, said switching system further including a controller connected to said switching matrix and responsive to said N input-output ports for controlling said cross-points to make requested interconnections between said plurality of N input-output lines, a method of switching signals through the matrix from said nodes comprising the steps of:

storing an indication of an active or inactive status of each of said N input-output ports in a port activity register having N stages, said N stages defining both row and column outputs;

using a triangular selection matrix containing N(N−1)/2 cells corresponding to all possible combinations of connections between said input-output ports and arranged in rows and columns, examining in parallel any potential connection combination to determine if a requested connection is possible between any port and any other port; and receiving an output from said selection matrix means and generating an address of a free port to be used in setting up a connection between a pair of said input-output ports.

5. The method as recited in claim 4 further comprising the step of establishing full duplex connections between each pair of input-output ports for which connections can be made.

* * * * *